Sept. 12, 1961 R. H. GAPP 2,999,610
RIVET SETTING TOOL
Filed April 18, 1958
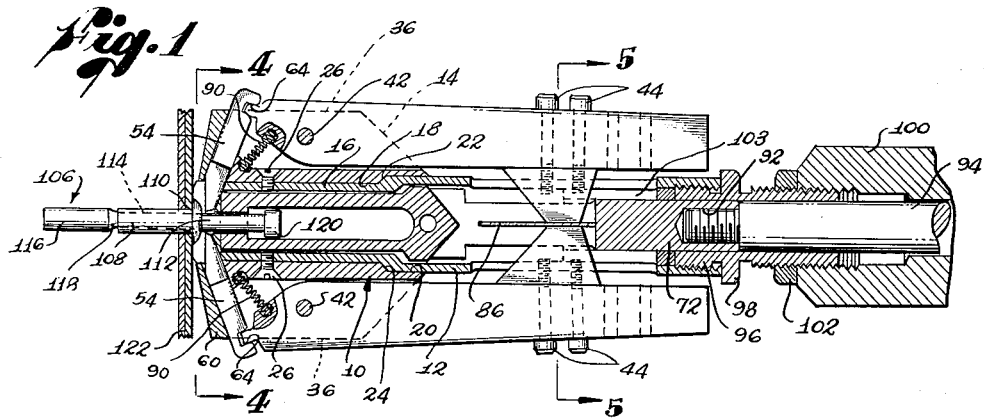
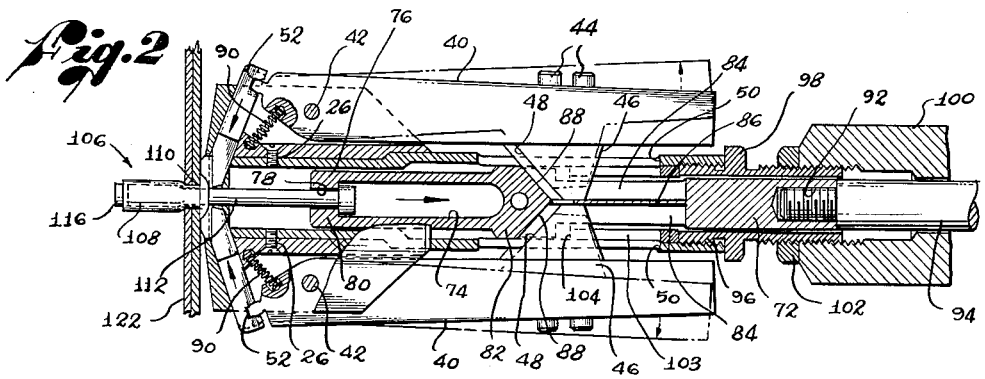
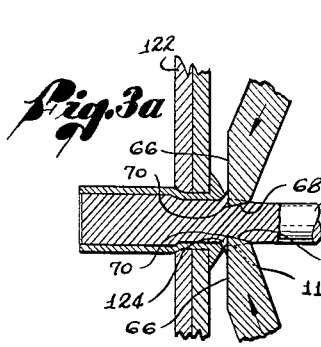
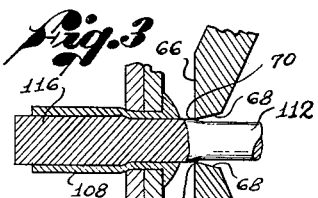
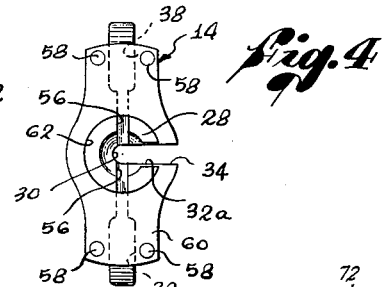
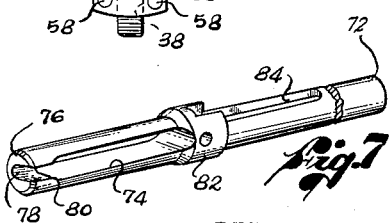
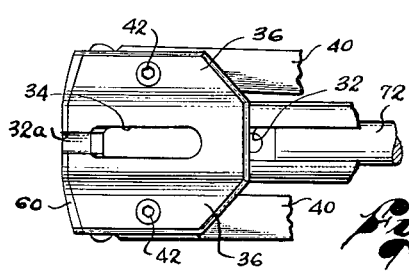
INVENTOR.
ROLAND HOWARD GAPP
BY
Ernest J. Filler
Attorney

United States Patent Office 2,999,610
Patented Sept. 12, 1961

2,999,610
RIVET SETTING TOOL
Roland H. Gapp, Santa Ana, Calif., assignor to Townsend Company, a corporation of Pennsylvania
Filed Apr. 18, 1958, Ser. No. 729,443
3 Claims. (Cl. 218—35)

This invention relates generally to rivet setting tools, and more particularly to a new and improved tool for setting certain types of blind rivets.

The present rivet setting tool is designed for use with blind rivets of the type disclosed in my co-pending application, Serial No. 503,448, filed April 25, 1955, now Patent No. 2,931,532, and entitled Rivets and Method of Riveting. Briefly stated, these rivets consist of a sleeve having an enlarged head at one end and a stem slideable in and protruding beyond opposite ends of the sleeve. The protruding end of the stem, remote from the sleeve head, is radially enlarged, there being a tapered shoulder between the enlarged and reduced portions of the stem.

In use, the sleeve and enlarged portion of the stem are inserted through a predrilled hole in a pair of workpieces until the sleeve head seats on the outer surface of the work. In this position, the inner end of the sleeve projects a distance beyond the inner surface of the work. The sleeve is now held stationary while the stem is pulled outwardly through the sleeve. The enlarged, inner end of the stem is thereby drawn into the sleeve and the inner, extending end of the sleeve is expanded radially outwardly over the inner surface of the work about the rivet receiving hole, to firmly lock the sleeve in position in the work. The outer, extending end of the stem is then cut off flush with the sleeve head.

During this setting operation, the enlarged end of the stem becomes tightly wedged in the sleeve. It has been found that in most instances the tight frictional contact between the sleeve and enlarged portion of the stem wedged therein is sufficient to prevent accidental separation of the latter from the sleeve. In some cases, however, it is desirable or necessary to provide for more positive retention of the stem in the sleeve.

A broad object of the present invention is the provision of a tool for setting blind rivets of the character described.

A more specific object of the invention is the provision of a blind rivet setting tool of the character described which operates to positively lock the stem against accidental separation from the rivet sleeve.

Another object of the invention is the provision of a blind rivet setting tool of the character described which, in a single operation, draws the enlarged portion of the stem of the rivet into the rivet sleeve to effect setting of the rivet and thereafter upsets the material of the stem into a recess in the head of the rivet sleeve, by a combined cutting and swaging operation, to effect positive retention of the stem in the sleeve.

A further object of the invention is the provision of a combined setting and swaging tool for blind rivets of the character described which may be arranged to effect severance of the outer, extending end of the stem flush with the sleeve head at the conclusion of the setting and swaging operations.

Yet a further object of the invention is the provision of a combined setting and swaging tool for blind rivets of the character described which is relatively simple in construction and operation, economical to manufacture, and otherwise especially well suited to its intended function.

Other objects, advantages and features of the invention will become readily apparent as the description proceeds.

Briefly, the objects of the invention are attained by the provision of a rivet setting tool conventionally equipped with a generally tubular body engageable at one end with the head of the rivet sleeve, and a draw bolt, engageable with the rivet stem, slideable in the body. During the rivet setting operation, the draw bolt is pulled rearwardly in the tool body to draw the enlarged inner end of the rivet stem into the rivet sleeve, in the manner preliminarily described.

In accordance with the present invention, the tool body mounts a pair of chisels which are forced into the stem, adjacent the head of the rivet sleeve, upon predetermined rearward movement of the draw bolt in the tool body. These chisels are mounted to perform a combined cutting and swaging operation on the stem which results in the material of the stem being upset into a recess in the head of the sleeve, so as to effect positive locking of the stem in the sleeve.

If desired, the tool may be designed to cause severance of the outer end of the stem flush with the rivet head at the termination of the setting and swaging operation.

A better understanding of the invention may be had from the following detailed description, taken in connection with the annexed drawings, wherein:

FIG. 1 is a view, in longitudinal section, of the present setting and swaging tool, showing the parts of the latter in their normal positions prior to a rivet setting operation;

FIG. 2 is a view similar to FIG. 1, and illustrating the parts of the tool in certain intermediate positions of operation;

FIG. 3 is an enlarged detail showing the cutting and swaging chisels of the present tool just prior to their penetration into the rivet stem;

FIG. 3a is a view similar to FIG. 3 showing the chisel blades after penetration into the rivet stem;

FIG. 4 is a view taken along line 4—4 of FIG. 1;

FIG. 5 is a section taken along line 5—5 of FIG. 1;

FIG. 6 is a side elevation of the forward end of the present tool; and

FIG. 7 is a perspective view of the drawbolt of the tool.

Referring now to these drawings, the present rivet setting and swaging tool will be seen to comprise a generally tubular body 10 including a sleeve 12 and a head 14. Sleeve 12 has a reduced forward end 16 which is slideably received in an axial bore 18 in the head 14 which opens through the forward end of the head. Bore 18 continues at its rear end in a counter bore 20, which opens through the rear end of the head 14 and slideably receives a portion of the enlarged rear end of the sleeve 12.

Axial insertion of the sleeve 12 into the head 14 during assembly of the tool is limited to the position shown, wherein the forward end of the sleeve extends a distance beyond the forward end of the head, by abutment of annular shoulder 22 on the sleeve with the annular shoulder 24 on the head at juncture of the bore 18 with counterbore 20. Screws 26 retain the sleeve and head in assembled condition.

The forward end of the sleeve 12 has an end wall 28 formed with an axial bore or opening 30 for receiving the stem of the blind rivet of the character preliminarily described, as will presently be more fully discussed. The wall of sleeve 12 has a longitudinal slot 32 which opens through the forward end of the sleeve and terminates just short of the right end of the sleeve. This slot extends radially through the sleeve end wall 28 to the central opening 30 in the end wall, as indicated at 32a in FIG. 4. The side wall of head 14, in turn, has a slot 34 opening through the left end of the head and aligned with the sleeve wall slot 32. The sleeve wall slot 32 and head slot 34 are slightly enlarged to the right of the sleeve end wall 28, as shown (FIG. 6), for reasons to be presently appreciated.

Head 14 comprises a pair of relatively flat, coplanar extensions 36 at diametrically opposite sides of the sleeve 12. These extensions have slots 38, disposed in a common axial plane of the head, which slots open through the forward, rear and radially outer edges of the extensions.

Pivotally supported on the head 14 within these slots 36 are a pair of lever arms 40. These arms are rockably supported on the head, for pivoting about axes proximate to the forward ends of the levers, by pins 42.

The rear ends of the levers 40 extend rearwardly along the outside of the sleeve 12 and terminate just short of the rear end of the latter. Fixed by bolts 44 to the opposing edge surfaces of the levers 40 adjacent the rear ends of the latter are a pair of cam follower blocks 46. These blocks, which have forward, inclined cam surfaces 48, project to the interior of the sleeve 12 through longitudinal slots 50 in the sleeve wall.

Formed at the forward end of each lever 40 is a tooth 52. The axes of the teeth 52 are inclined with respect to the rear ends of the levers 40, as shown.

Indicated at 54 are a pair of inclined chisel blades. The outer ends of these blades are slideably received in the slots 38 of the head extensions 36. The inner ends of the chisel blades are slideably received in slots 56 formed in the sleeve end wall 28 in a plane normal to the plane of the end wall slot 32a, as will be most readily observed in FIG. 4. Slots 38 and 56 form transverse guideways in which the blades 54 are movable into and out of the bore 30 in the forward end of the body 10.

The forward edges of the head extensions 36 are inclined at approximately the same angle as and are substantially flush with the forward edges of the chisel blades 54. Secured by cap screws 58 to these inclined forward edges of the head extensions is a cap plate 60. This cap plate overlies the chisel blades so as to retain the latter in the head. Formed in the cap plate is a central circular opening 62 which receives the forward end of the sleeve 12. The cap plate is slotted in alignment with the end wall and body slots 32a and 34, as shown.

Chisel blades 54 have recesses 64 which rockably receive the lever teeth 52. When the levers 40 are rocked outwardly from their normal positions of FIGS. 1 and 2, the blades 54 are moved toward one another. Similarly, when the levers 40 are rocked inwardly from their phantom line position of FIG. 2, the blades 54 are moved away from one another.

The inner ends of the chisel blades 54 have flat, forward faces 66 in planes approximately normal to the axis of the tool and flat end faces 68 inclined at an acute angle to the forward faces 66. The intersections of the forward and end faces 66 and 68 form cutting edges 70.

Slideably received in the sleeve 12 is a draw-bolt 72. The forward end of this draw-bolt has a slot 74, the forward end of which terminates at an end wall 76. This end wall 76 has an axial opening 78 and a radial slot 80, in the plane of the sleeve-end-wall and body slots 32a and 34, which extends from the axial opening 78 through the side of the draw-bolt.

Draw-bolt 72 has an intermediate cylindrical enlargement 82. Rearwardly of the enlargement 82, the draw bolt 72 is formed with a pair of diametrically opposed slots 84 disposed in the plane of and which slideably receive the cam follower blocks 46 on the levers 40. The slots 84 are separated by a thin transverse web 86 against which the inner edges of the cam follower blocks 46 are adapted to slideably bear.

Slots 84 in the draw-bolt extend into the rear side of the draw-bolt enlargement 82 to form on the latter a pair of inclined cam faces 88 which diverge toward the forward end of the tool, as shown. During operation of the tool, as will presently be seen, engagement of the cam faces 48 on the cam follower blocks 46 with the cam faces 88 on the draw-bolt 72, when the latter is retracted rearwardly in the sleeve 12, causes outward camming of the rear ends of the levers 40 and inward longitudinal movement of the chisel blades 54. Springs 90 serve to bias the levers 40 to their normal positions of FIGS. 1 and 2.

The rear end of the draw-bolt 72 has a threaded axial opening 92 for threaded engagement with the pull rod 94 of the conventional "pulling gun." Threaded in the rear end of the tool sleeve 12 is an adaptor sleeve 96 through which a draw-bolt 72 slideably extends. Adaptor sleeve 96 has a head 98 which is engageable with the rear end of the tool sleeve 12 to limit threading of the adaptor sleeve into the tool sleeve.

The rear end of the adaptor sleeve 96 is externally threaded for threaded engagement with the body 100 of the "pulling gun." The adaptor sleeve has a jam nut 102 threaded thereon to permit locking of the adaptor sleeve to the body 100.

A stop sleeve 103, forwardly of the adaptor sleeve 96, is slotted for receiving the cam follower blocks 46 and has a predetermined length such that the end face 104 of the stop sleeve is located in a predetermined position along the tool sleeve 12. This forward end face of the stop sleeve is engageable with the enlargement 82 of the draw-bolt 72 to limit rearward travel of the latter in the tool sleeve.

As preliminarily mentioned and more fully described in the aforementioned co-pending application, Serial No. 503,448, the blind rivet 106 with which the present tool is designed to be used, comprises a sleeve 108 having an enlarged head 110 at one end. The stem 112 of the rivet comprises a central portion 114 which is slideably received in the sleeve 108. The end of the stem 112, remote from the sleeve head 110, is enlarged as shown at 116, there being a tapered shoulder 118 between the enlargement 116 and the central stem portion 114. The other end of the stem 112 has an enlarged head 120.

In use of the present tool to set the blind rivet 106, the latter is first inserted in aligned holes in a pair of workpieces 122 to be riveted. The forward end of the tool is then placed proximate to the workpiece and moved laterally toward the rivet stem 112, so that the latter passes through the slots 32a, 34 and 80 in the sleeve end wall 28, body 14, and draw-bolt end wall 76, respectively, into the central openings 30 and 78 in the sleeve end wall 28 and draw-bolt end wall 76. The enlarged head 120 on the rivet stem now engages behind draw-bolt end wall 76, as shown in FIGS. 1 and 2.

When the pulling head is operated, the forward end of the tool sleeve 12 is pressed against the head 110 of the rivet sleeve 108, while the draw-bolt 72 is pulled rearwardly in the tool sleeve 12. This results in drawing of the inner enlarged end 116 of the rivet stem 112 into the inner end of the rivet sleeve. The sleeve is thereby expanded, as shown in FIG. 2, and draws the workpieces 122 together with a strong clinching action. Continued pulling of the rivet stem 112 through the sleeve 108 results in "necking down" of the enlarged portion of the stem, the latter being drawn through the sleeve until the "unnecked down portion" of inclined shoulder 118 on the stem projects slightly beyond the sleeve head 110, as shown in FIG. 3.

The tool is designed so that the cam faces 88 on the draw-bolt 72 do not engage the cam faces 48 on the cam follower blocks 46 of the levers 40 until the draw-bolt 72 has been pulled rearwardly sufficiently to draw the rivet stem to the position of FIG. 3. Continued rearward travel or pulling of the draw-bolt 72 beyond the position of FIG. 3 results in outward camming of the levers 40, by engagement of the cam faces 88 on the draw-bolt with the cam faces 48 on the levers, to move the chisel blades 54 inwardly to the position of FIG. 3a, wherein the chisel edges 70 bite into the rivet stem 112, as illustrated.

It will be observed that during inward movement of the chisel blades from their positions of FIG. 3 to the positions in FIG. 3a, the tips of the blades are forced radially into and axially along the rivet stem. This compound movement of the chisel blades combined with some continued movement of the stem results in a combined cutting and swaging operation which upsets the metal of the rivet stem into an annular recess 124 in the rivet head 110, so as to positively lock the rivet stem against separation from sleeve 108. The tool is then removed and the outer end of the rivet stem is broken or cut off flush with the rivet head.

It will be observed in the drawings that seating of the rivet head against the forward end wall 28 of the tool sleeve locates the chisel blades 54 with respect to the rivet head. In this way, the chisel edges 70 of the blades initially contact the rivet stem 112 at a predetermined distance (FIG. 3) from the rivet head to allow for proper swaging of the stem during subsequent inward and forward movement of the chisel edges.

Rearward travel on the draw-bolt 72 in the tool sleeve 12 is limited to limit penetration of the chisel blades in the rivet stem by engagement of the draw-bolt enlargement 82 with the end face 104 of the stop sleeve 103. It will be apparent that shortening the stop sleeve will allow increased rearward travel of the draw bolt 72 and, therefore, greater penetration of the chisels into the rivet stem 112. If desired, the tool might be set so that this penetration is sufficient to enable the stem to be severed by the pull exerted thereon by the draw-bolt. Also, the levers 40 may have additional openings for receiving the cam follower block securing bolts 44 to permit adjustment of the blocks along the lever arms. In this way, the cam follower blocks can be adjusted along the lever arms to accommodate the tool to rivet stems of various lengths.

In the tool illustrated, the end wall 28 of the sleeve 12 is formed with a spherical recess for seating the illustrated universal rivet head. In case of a flat rivet head, the end wall will have a flat forward surface for abutting the rivet head.

Numerous other modifications in the design and arrangement of parts of the invention are possible within the scope of the following claims.

I claim:

1. A setting tool for a blind rivet of the character described including a headed sleeve and a stem, comprising a sleeve open at its rear end and having an end wall extending across its forward end, said end wall having a forward face for seating against the head of the rivet sleeve and an axial bore through which the rivet stem may extend into said sleeve, a draw-bolt slideable in said sleeve and having means drivingly engageable with the rivet stem for pulling of the latter into the sleeve by rearward movement of said draw-bolt in the sleeve, an enlarged head at the forward end of said sleeve, said head having slots at diametrically opposite sides of and in a common axial plane of the sleeve, a pair of axially extending levers having forward ends slideably received in said slots and rear ends extending rearwardly along the outside of said sleeve, means connecting an intermediate point of said levers to said head for pivoting of the levers in said axial plane, a pair of chisel blades slideably received in said slots and having inner tip ends slideably received in slots in said end wall which open into said axial bore, said blades having cutting edges at their inner tip ends and being longitudinally movable along direction lines inclined rearwardly of said sleeve at acute angles to the sleeve axis to extend said cutting edges into and retract said edges from said axial bore to indent the rivet stem, means connecting the adjacent levers and blades for movement of the latter by pivoting of said levers, cam followers on said levers extending to the interior of said sleeve through slots in the sleeve wall, and cam surfaces on said draw-bolt engageable with said cam followers to pivot said levers to extend said cutting edges into said axial bore when said draw-bolt is moved rearwardly to a predetermined position in said sleeve.

2. A setting tool for a blind rivet of the character described including a stem and a headed sleeve, comprising an elongate body having a longitudinal guideway and a forward end wall extending across the adjacent end of the guideway, said end wall having a forward face for seating against the head of the rivet sleeve and a reduced bore coaxial with said guideway opening through said face into the guideway through which the stem of the rivet may extend into the guideway, a draw-bolt axially slidable in said guideway and having means at its forward end engageable with the rivet stem for pulling of the latter into the body by rearward movement of the draw-bolt in the body, the forward end of said body having a pair of transverse guideways at diametrically opposite sides of said bore opening at their inner ends to said bore behind said forward face of the body and through said forward face, a chisel blade slidable in each transverse guideway having a chisel edge at its inner end movable into and out of said bore to indent the part of the rivet stem within the bore, the longitudinal axes of said guideways being rearwardly inclined at an acute angle to the axis of said bore and guideway whereby when the blades are moved inwardly in their respective guideways toward the last-mentioned axis, the cutting edge of each blade has a component of movement normal to the latter axis and a component of forward movement parallel to the latter axis so that the rivet stem is simultaneously indented and swaged toward the rivet head by the blades, and means coacting between the draw-bolt and blades to move the latter inwardly in their guideways when the draw-bolt is moved rearwardly in the body.

3. A setting tool for a blind rivet of the character described including a stem and a headed sleeve, comprising a body having a forward end and an axial guideway which opens through the forward end of the body to receive the rivet stem, a draw-bolt axially slidable in said guideway, means on the forward end of said draw-bolt for engaging a rivet stem positioned in the guideway for pulling of the stem into the guideway upon rearward movement of the draw-bolt in the guideway, stem indenting mechanism on said body including a pair of levers on the body at opposite sides thereof and extending lengthwise of the body means pivotally supporting each lever on the body for rocking of each lever in a longitudinal plane of the body and on a transverse axis located intermediate the ends of the respective lever, a chisel blade at the forward end of each lever, means connecting each blade to the forward end of the adjacent lever for movement of the blades toward the axis of the guideway to indent the stem positioned in the guideway upon pivoting of said levers in one direction and retraction of said blades away from the axis of the guideway upon pivoting of the levers in the opposite direction, a cam follower on the rear end of each lever, cam surfaces on said draw-bolt engageable with the cam followers to pivot said levers in said one direction upon rearward movement of the draw-bolt in said body, and means for adjusting the position of each cam follower lengthwise of its respective lever.

References Cited in the file of this patent

UNITED STATES PATENTS

| 2,400,354 | Jensen | May 14, 1946 |
| 2,438,201 | Buchet | Mar. 23, 1948 |
| 2,447,589 | Mellerio et al. | Aug. 24, 1948 |
| 2,467,610 | Cherry | Apr. 19, 1949 |